(No Model.) 2 Sheets—Sheet 1.
C. RETTIG.
APPARATUS FOR AERATING, COOLING, AND CLARIFYING LIQUORS.
No. 498,571. Patented May 30, 1893.
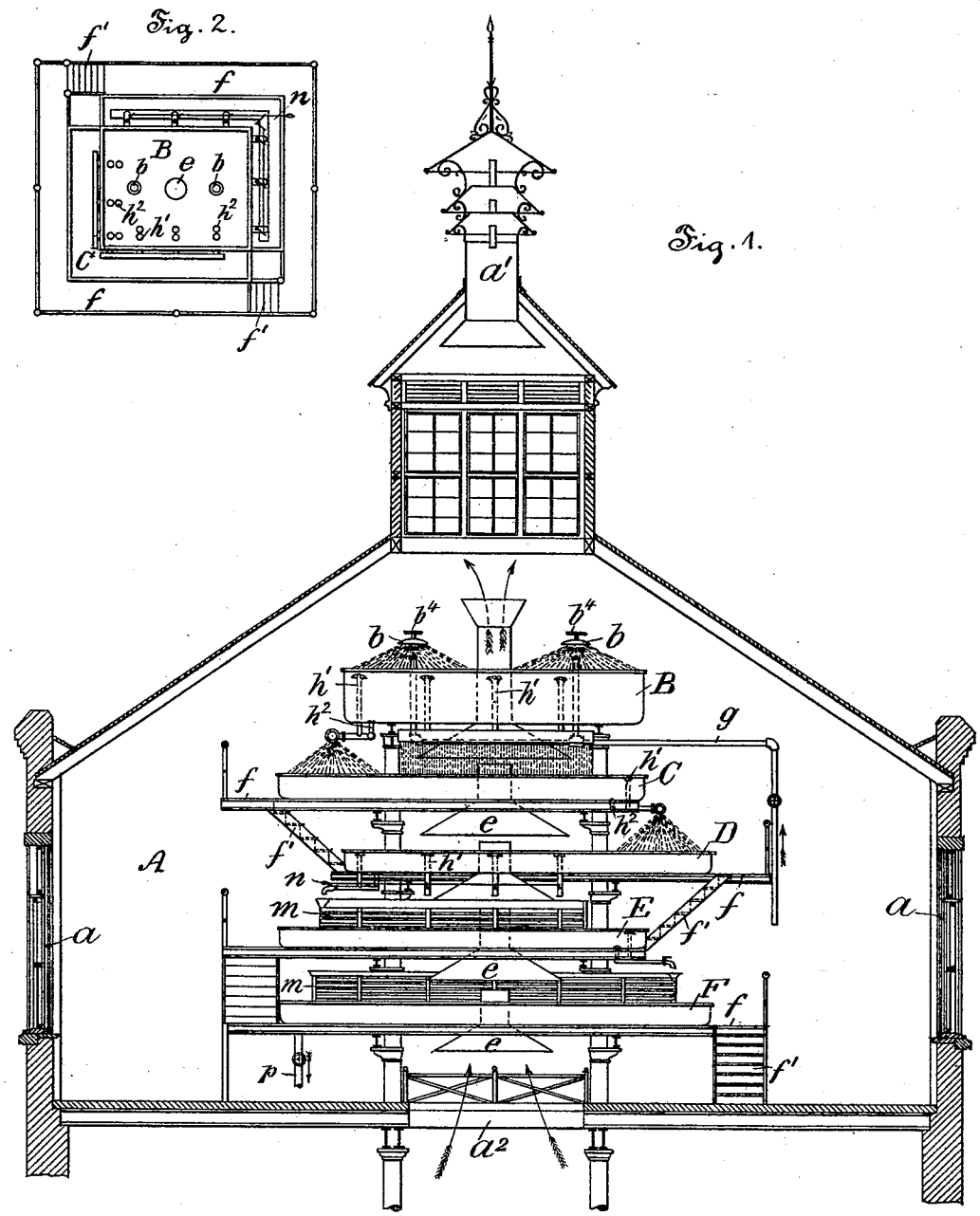
Witnesses:
Philipp Kassel.
O. Bormann
Inventor:
Charles Rettig
by Hermann Bormann
Att'y (No Model.) 2 Sheets—Sheet 2.
C. RETTIG.
APPARATUS FOR AERATING, COOLING, AND CLARIFYING LIQUORS.
No. 498,571. Patented May 30, 1893.
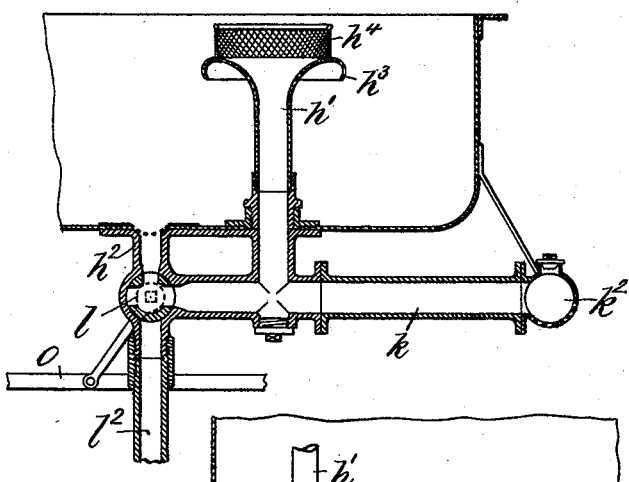
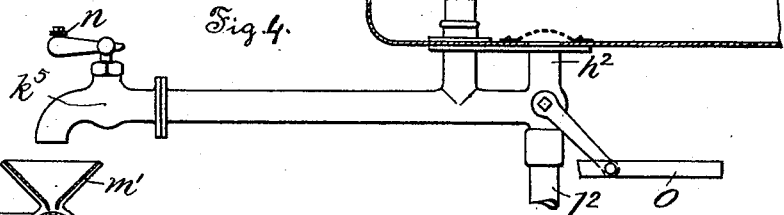
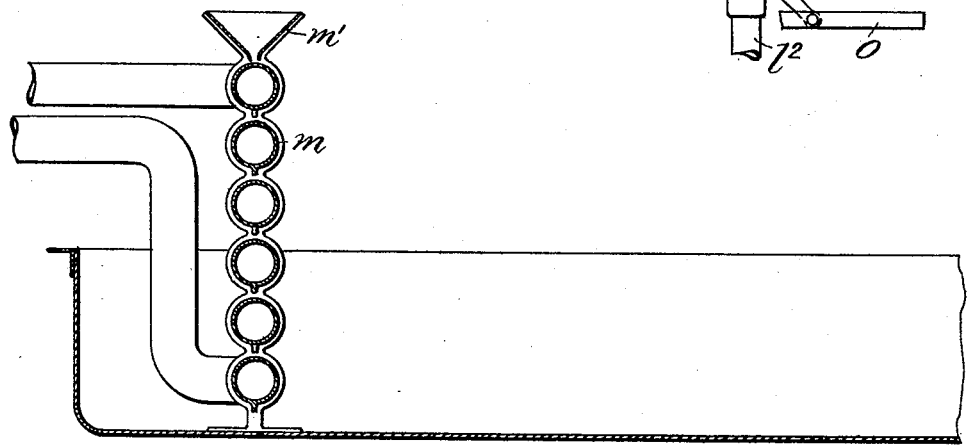
Witnesses:
Philipp Kassel.
O. Bormann.
Inventor:
Charles Rettig.
by Hermann Bormann
att'y.

UNITED STATES PATENT OFFICE.

CHARLES RETTIG, OF PHILADELPHIA, PENNSYLVANIA.

APPARATUS FOR AERATING, COOLING, AND CLARIFYING LIQUORS.

SPECIFICATION forming part of Letters Patent No. 498,571, dated May 30, 1893.

Application filed October 12, 1892. Serial No. 448,698. (No model.)

*To all whom it may concern:*

Be it known that I, CHARLES RETTIG, a subject of the Emperor of Germany, (having declared my intention of becoming a citizen of the United States,) residing at Philadelphia, in the county of Philadelphia and State of Pennsylvania, have invented certain new and useful Improvements in Processes of and Apparatus for Aerating, Cooling, and Clarifying Liquids, of which the following is a specification.

My invention relates to the process of and apparatus for aerating, cooling and clarifying liquids and are more applicable for use in breweries and distilleries.

Heretofore the wort or other liquid having been boiled or treated in the brewing kettle in breweries or stills was conveyed to and through a hop or grain-receptacle, and pumped or otherwise directed into shallow tanks or "coolships" as they are generally called for reducing the temperature of such liquids and to expose the latter to the atmosphere to absorb some oxygen contained in the air the liquids are also clarified, as the solid matter in the same precipitates and is retained in the cool ship, and this process of cooling may properly be termed "a natural cooling process," in contradistinction to an artificial cooling process by which sterilizing or closed cool apparatus were employed, consisting of closed tanks having pipe coils containing a cooling medium. This artificial cooling process is very expensive owing to the high priced apparatus and machinery for running the same and the employment of ice, ammonia, &c., to obtain a sufficiently low temperature in the closed or sterilizing apparatus, and for these reasons the latter process has not been employed very extensively.

The disadvantages of the above named cooling processes and their apparatus are very numerous and the following may here be mentioned: First, the proper room, space and location are generally not attainable where coolships ought for convenience be located. Second, the mounting of the large and shallow cool ship is very difficult, requiring a strong foundation and solid superstructure throughout its bottom, and the cool ship must be transported in parts to its place of location and there put together and tightened. Third, on account of their size such coolships have to be made of considerable strong material which causes the high price of the same. Fourth, the cleanliness in and around the coolship and also in the sterilizing apparatus, is very difficult to maintain. The cool ship is generally located near the floor, so that dirt or other extraneous matter collect at places and supports which are not readily accessible, and which collections give off bad odors, &c., in default of ventilation. In tightly-closed cool or sterilizing apparatus having series of pipes and in which the wort is either forced through or around the same infection from the atmosphere is of course excluded, but facts have shown, that the many pipes, corners and cavities of these apparatus are the most dangerous parts for infection. Fifth, it is next to impossible to maintain these apparatus in a clean condition by mechanical devices or otherwise, and the liquid running through these sterilizing or closed apparatus is more or less subject to contamination and affection. Sixth, the cost of the building, floor space and tanks is considerable owing to the surface required for the cool ships and is really a wasting of valuable room, which could be utilized for other purposes. Seventh, in case of such cool ships being placed above the fermenting room, it is impossible to increase the capacity of a brewery by erecting stories above the fermenting room, as is often required, without stopping operation of the entire brewery, which if necessary entails heavy pecuniary losses to the brewer; and in case the cool ship is located above the brewing room the ventilation for the mash tub and beer kettle is cut off and if such ventilation is made, all the vapors and fumes are directed into the cooling room interfering more or less with the natural cooling process, as the hot vapors come into contact with the cool ship and prevent a quick cooling of the wort as is required to avoid infection, &c. Eighth, the large surface of a cool ship exposed to the atmosphere is subject to collecting a large amount of dust and other impurities of the air, causing an inferior quality of beer or other liquid. Ninth, to rapidly cool the wort or other liquid in hot weather it was always necessary to employ a pipe cooler to reduce the wort to the proper temperature before being deposited in the fermenting tanks and this involved considerable expense in apparatus, labor, ice, machinery, &c.

It has been found in practice that to retain all the pure albuminous substances, to clarify and to bring the wort readily to fermentation, and to improve the keeping qualities of the resulting beer, ale or other malt liquor, the hot wort having undergone the brewing process, had to be aerated, i. e.. the hot wort had to be brought as much and as quickly as possible into contact with pure air, and this air is most effectually obtained by spraying the hot wort over a large area, when the vapors arising from the wort will drive away all impurities from the air, and the wort itself absorbs, pure oxygen in large quantities, whereby the wort is also reduced in temperature. After the wort is aerated the same should be clarified, all foreign matter eliminated and further reduced in temperature to about 50° Fahrenheit when it is ready to be deposited in the fermenting vats. I obtain these results by my improved process which comes near the natural process heretofore pointed out and which improved process is as follows: The hot wort as it leaves the hops or grain receptacle is forced to and through a spraying device, located some distance above a series of tanks, by which the wort is aerated and cooled as before described and is directed into a tank where it sets off most of all the solid matter contained in the same. The overflowing wort is then strained and again sprayed, aerated, further cooled and led into another tank and so on until the full charge of a brew kettle is deposited into a series of tanks. After a proper time, i. e., when the wort is sufficiently clear and cool the discharge pipes of the lastly and firstly filled tanks are opened and the wort is allowed to flow from the receiving tank into the next tank to and through a strainer, when again all the tanks will successively discharge their contents into the respective tanks to and through straining and spraying apparatus by which as before stated the wort is quickly cooled, aerated, and also clarified. Should it become necessary to hasten the cooling process as is sometimes required in very hot weather one or two pipe coolers may be arranged in the lower tanks to more efficiently cool the wort or other liquid.

To carry my process into effect a series of tanks is provided, which may be of any suitable area and placed one above the other, in order to save space, pumps and other machinery; and by the arranging of smaller open tanks located one above the other, all the disadvantages hereinbefore named and relating to the natural cooling process of wort or other liquids are obviated.

A set of apparatus to carry the improved cooling process into effect is illustrated in the accompanying drawings in which—

Figure 1 is a sectional elevation of a cooling room which may be located in the highest story of the brewing house and containing my improved apparatus and showing a series of tanks located one above the other, and surrounded by platforms. Fig. 2 is a plan view of the series of tanks showing the relative position of the same to each other. Fig. 3 is a detail view of an overflow pipe with discharge connection and sprayer, and Fig. 4 is a detail view showing one of the lower tanks provided with a pipe cooler connected with an overflow and discharge pipe of the next upper tank.

Referring now to the drawings for a further description of my invention A is the cooling room which is provided with windows $a$, and ventilator $a'$ to maintain a current of fresh air at all times therein, and this room may conveniently be placed in the highest story of a brewery and connected with an airshaft $a^2$, or air feed pipes may be provided to maintain a supply of fresh and pure air.

A series of tanks or surface coolers B. C. D. E. and F. of suitable size and shape are supported by columns and beams, and each of these tanks is surrounded by a platform $f$ to which access is had by stairs $f'$ to allow the attendant in charge of manipulating the different apparatus and to conduct the process of cooling, aerating and clarifying the wort or other liquid contained in the tanks. Over each of the tanks or surface coolers is arranged a vapor or steam collector $e$ which leads the vapors or steam through the ventilator $a'$ into the open air. The upper tank B is provided with one or more spraying apparatus $b$, secured to the wort or other liquid conducting pipe $g$, in order to spray or deposit the wort in a finely divided state into the rectangular or other shaped tank B.

All the tanks are provided with an overflow pipe $h'$, and a discharge pipe $h^2$ both of which have sieves to prevent the flowing off of the sediments of the liquid or wort from one tank into another and these pipes may preferably be constructed as shown in Fig. 5 in which the overflow pipe $h'$ is expanded on its upper end and forms a skirt $h^3$ upon which a sieve $h^4$ is mounted to withhold all floating substances and to prevent the same from entering the pipe $h$ which communicates with the perforated pipe or sprayer $k^2$ in order to discharge the overflowing liquid or wort in rays into the next tank below. The offlet pipe $h^2$ is attached to the bottom of a tank and provided also with a sieve to retain the sediments of the liquid or wort in the tank in which they are precipitated; and this pipe may be brought into or out of communication with the perforated pipe or sprayer $k^2$ by the three way cock $l$ by which the liquid or wort is either prevented from flowing from the tank to which the pipe $h^2$ is attached or to allow the same to flow through sprayer $k^2$ into the next tank below or to take it directly from such tank or surface cooler to the fermenting tubs by the pipes $l^2$. This latter pipe $l^2$ also serves for conducting the rinsing water when the tanks are to be cleaned. Instead of using the sprayer $k^2$ as shown in Fig. 5, a pipe cooler $m$ may be mounted in the tank next below the tank to which the overflow is attached, through the pipes of which any cooling medium is forced. In such instance the sprayer $k^2$ is replaced by a common stop valve $k^5$ directing the liquid or wort into a gutter $m'$ from which it trickles or runs over the outer cooled surfaces of the pipe cooler $m$. To manipulate manually all the valves on one or the other of the tanks, rods $n$ and $o$ may be provided which are connected to all the respective valves in series and by pushing the rod one way or the other all the valves may be opened or closed as required.

The conducting of the process of cooling, aerating and clarifying liquids with my improved apparatus may be described as follows:—The liquid or wort is drawn or forced through the pipe $g$ and sprayer $b$ which cause the liquid to be deposited or fall in a spray into the tank B. The liquid or wort is thereby most efficiently brought into contact with the clear atmosphere maintained by the windows and ventilators, and absorbs therefrom large quantities of oxygen, and is also reduced considerably in temperature; the resulting steam or vapors being carried off by the ventilator $a'$. As soon as the height of the liquid in the tank B reaches the overflow $h'$, the pipe $k$, conducts the overflowing liquid or wort to and through the sprayer $k^2$, by which the same is again brought into contact with the atmosphere and aerated and this overflowing and spraying of wort or other liquid successively into other tanks is continued until the full charge of a brewing kettle is deposited in the tanks B. C. D. E. and F, which latter should be of such dimensions, as to hold the same. After some time standing in these tanks, and when sufficiently cool and clear, the liquid or wort is drawn off into fermenting tubs not shown, by the pipe $p$, and this is accomplished as follows:—The valves for discharging the wort or other liquid from the lower tank F, and the discharge valves of the uppermost tank B are opened allowing the wort or liquid to pass the strainer $k^2$ of the tank B and deposit the same in a spray on top of the wort or liquid already contained in the tank C. The overflowing liquid is then deposited in a spray in the tank D, and so on until it passes the lowest tank, from which it is taken direct by the pipe $p$, to the fermenting tubs. After the upper tank has been emptied, the discharge pipe $h^2$ of the tank C is opened and its contents are similarly conducted to the fermenting tubs, and so on until all the tanks B, C, D, E, and F are emptied and their contents passed to and through all the different spraying devices and the pipe $p$, into the fermenting tubs.

It will be seen that the wort or other liquid by my improved process and apparatus is clarified very efficiently, as each individual tank retains the sediments precipitated from the wort or liquid contained in such tank, and that the same is readily cooled and also aerated as the liquid or wort passes as many spraying apparatus as there are tanks and is brought into contact with fresh and pure air supplied by the windows and ventilators.

It may be remarked, that in hot weather, pipe coolers $m$ as shown in application to the lower tanks E and F, may be brought into service when it is necessary to conduct the process of cooling, aerating and clarifying liquids or wort very quickly in order to obviate the forming of schizophytes, wild yeast or other contamination.

Having thus described the nature and objects of my invention, what I claim as new, and desire to secure by Letters Patent, is—

1. The process herein described for cooling aerating and clarifying malt liquors, which consists of depositing or forcing the wort in a finely divided state or spray into a surface cooler, allowing the overflowing wort to be deposited in a like manner successively into a series of similar tanks located below each other, whereby the said malt liquors are aerated and cooled and the impurities contained in the wort are precipitated in each tank, and of discharging the contents of the tanks by causing the malt liquors or wort to pass each of the tanks and the spraying apparatus as described, substantially as and for the purposes set forth.

2. For the process of cooling malt liquors a series of surface coolers located one above the other, means for conducting the wort or liquor to the top surface cooler and means for conveying successively into each tank or surface cooler the overflowing contents of the above located cooler substantially as and for the purposes set forth.

3. For the process of cooling malt liquors a series of surface coolers located one above the other, means for conducting and forcing the wort to and through a spraying apparatus adapted to deposit the wort in a finely divided state into the top surface cooler, overflow pipes in each of the series of surface coolers having spraying apparatus adapted to deposit the wort in a similar state successively into each of the coolers in series substantially as and for the purposes set forth.

4. For the process of cooling aerating and clarifying malt liquors in the course of their manufacture a series of tanks located one above the other and surrounded by platforms means for conducting the liquors to the top tank and forcing it through a sprayer located above said tank, overflow pipes and sprayers attached to each tank in the series of tanks whereby the liquors discharged into the top tank are conveyed and deposited in a finely divided state successively in the series of tanks and means attached to each of said tanks, whereby the liquor or liquors may be drawn directly from each tank in the series substantially as and for the purposes set forth.

5. For the process of cooling aerating and clarifying malt liquors a cooling room comprising an air shaft, windows disposed oppositely to each other and a ventilating tower whereby a supply or draft of fresh air is obtained, in combination with a series of tanks located one above the other and each having a funnel to carry the vapors directly into the ventilating tower, platforms surrounding the said tanks, means for conducting and forcing the wort or malt liquors to and through a spraying apparatus adapted to deposit the wort in a finely divided state into the top tank and means for conveying the said liquors successively from one tank to another substantially as and for the purposes set forth.

6. For the process of cooling aerating and clarifying malt liquors a cooling room comprising ventilating tower and windows disposed oppositely to each other, whereby a supply or draft of fresh air is maintained, in combination with a series of tanks located one above the other and each having a funnel to lead the resulting vapors and fumes to and through the ventilator tower conveying and spraying devices attached to each of the tanks, means for directing the liquid through a spraying device into the top tank and allowing the same to pass the different tanks and spraying devices in series substantially as and for the purposes set forth.

7. For the process of cooling aerating and clarifying malt liquors, a cooling room comprising a series of tanks located one above the other means for conveying the liquor to the uppermost tank and forcing the same through a sprayer overflow pipes and spraying devices connected to the lower tanks, and pipe coolers located in the lowest substantially as and for the purposes set forth.

8. In apparatus for cooling, aerating and clarifying liquids a tank having an overflow and discharge pipe and sprayer in combination with a three way cock adapted to direct the contents of the tank into the sprayer or into the discharge pipe substantially as and for the purposes set forth.

In witness whereof I have hereunto set my signature in the presence of two subscribing witnesses.

CHARLES RETTIG.

Witnesses:
BERNHARDT HAUG,
HERMANN BORMANN.